March 10, 1959     G. J. STORATZ     2,877,024
HITCH FOR CONNECTING VEHICLES TO TRACTORS
Filed July 5, 1956
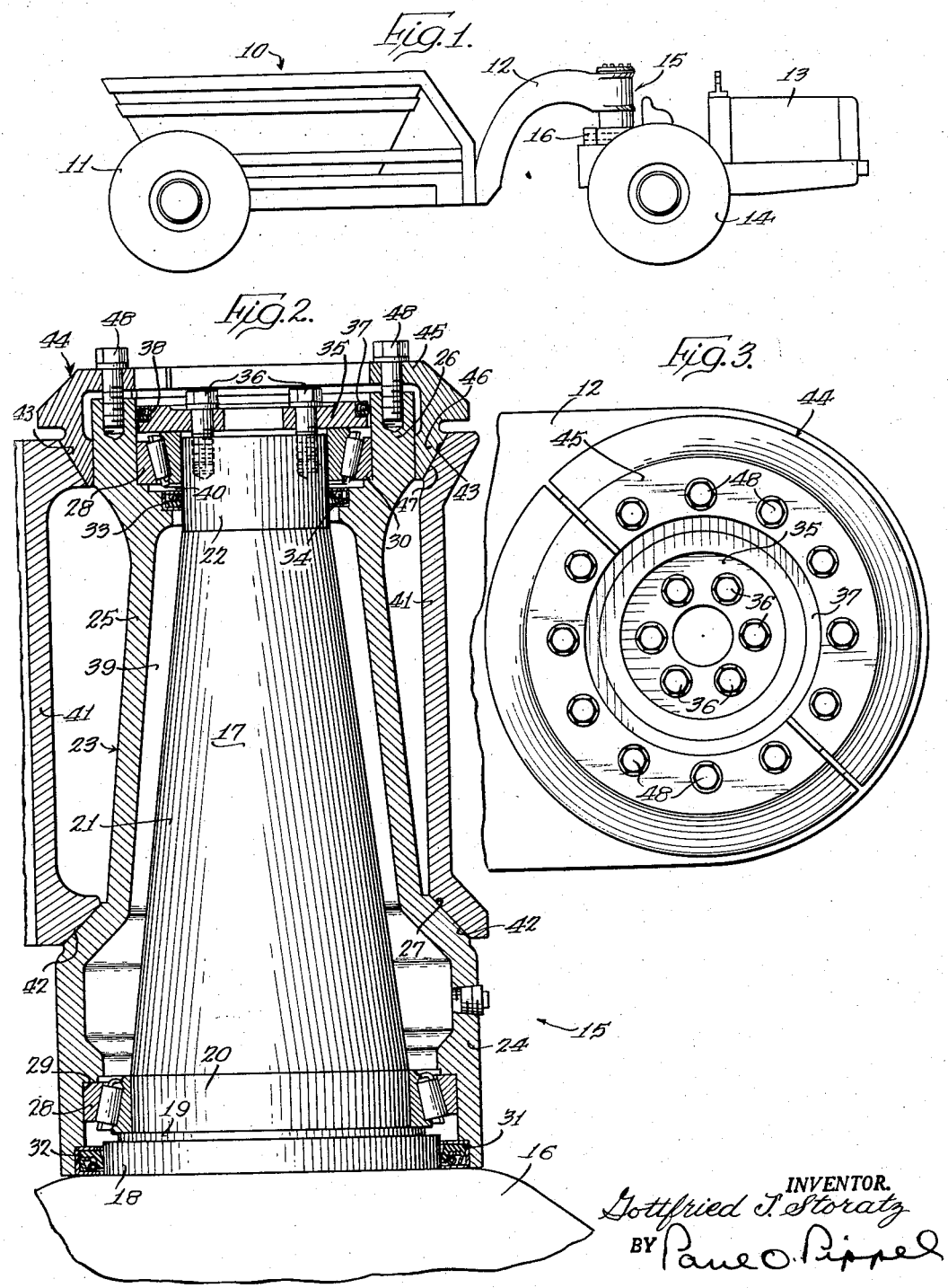
INVENTOR.
Gottfried J. Storatz
BY Paul O. Pippel
Atty:

United States Patent Office 2,877,024
Patented Mar. 10, 1959

2,877,024

HITCH FOR CONNECTING VEHICLES TO TRACTORS

Gottfried J. Storatz, Park Ridge, Ill., assignor to International Harvester Company, a corporation of New Jersey Application July 5, 1956, Serial No. 595,930

4 Claims. (Cl. 280—400)

This invention relates to hitches for connecting a trailing vehicle to a tractor.

An object of the invention is to provide a construction whereby the spindle is completely enclosed at all times whether the trailing vehicle is connected or disconnected to the tractor thus preventing damage or element action to the machined surfaces of the spindle.

Another object of the invention is to provide an improved hitch whereby a large number of different types of trailing vehicles may be connected to the tractor.

The foregoing and other objects of the invention will be apparent from the construction and arrangement illustrated in the accompanying drawing wherein:

Figure 1 is a side elevational view of a tractor and a vehicle connected to the tractor, Figure 2 is a vertical sectional view of the hitch for connecting the vehicle to the tractor, and Figure 3 is a top plan view of the hitch.

In prior structures where there was only a single housing and this housing was part of the gooseneck of the vehicle it was difficult to get proper pre-loading upon the bearings because the gooseneck would tend to pry through the bearings against the spindle particularly if the tractor and trailer vehicles are not exactly on level ground and thereby making it difficult to establish the proper endwise positions for the bearings. Also, because of the mass of the gooseneck and the downward force imposed thereon by the trailing vehicle it was impossible to accurately determine whether a proper axial pre-loading was being placed upon the bearings.

The invention proposes an improved hitch for connecting a vehicle to a tractor. An upright spindle is mounted on the tractor and a housing is rotatably mounted on the spindle by means of bearings disposed between the housing and the spindle. Another housing is rotatably mounted on the first named housing and a cap is secured to the first named housing and has a circular wedge which projects between the two housings to hold the second named housing concentric with respect to the axis of the spindle. This invention has the advantage that the first named housing completely encloses the spindle at all times whether the trailing vehicle is connected or disconnected to the tractor thus preventing damage or element action to the machined surfaces of the spindle. The invention also has the advantage that with this type of hitch a large number of different types of trailing vehicles may be connected to the tractor.

In the drawings, 10 generally designates a trailing vehicle having a pair of wheels 11 at its rear end and a gooseneck 12 is secured to the front end of the vehicle. The vehicle 10 may be a scraper, a low bed trailer or a wagon. A tractor 13 has two wheels 14 and is connected to the vehicle 10 by a hitch generally designated 15. The hitch 15 has a lower structure 16 which is mounted on the main frame of the tractor for rotative movement about an axis extending longitudinally of the tractor as shown in Figure 1. An upright spindle 17 is made integral with the structure 16 and the lower end of the spindle has a circular section 18 of predetermined diameter and another circular section 19 of smaller diameter than the section 18 and another circular section 20 of smaller diameter than the section 19. The spindle 17 is tapered from the section 20 as at 21 until it joins a circular section 22. A generally circular housing 23 is disposed on the spindle 17 and has a lower circular section 24 and a central section 25 having a smaller diameter than the section 24 and tapering upwardly from the section 24 and an upper circular section 26. An upwardly and inwardly inclined shoulder 27 is formed where section 24 joins section 25. A pair of spaced roller bearings 28 are arranged one above the other and are disposed between the inner face of the housing 23 and the spindle 17 to rotatably mount the housing on the spindle. The lower one of the roller bearings 28 surrounds the section 20 and rests on the section 19 of the spindle and it also fits in a recess 29 in the housing 23. The upper one of the roller bearings 28 surrounds the section 22 of the spindle and it also fits in a recess 30 in the inner face of the housing 23. A sealing means 31 is disposed below the lower one of the roller bearings 28 and is positioned between the inner face of the housing 23 and the spindle 17 and surrounds the section 18 of the spindle and fits in a recess 32 in the housing. A sealing means 33 is disposed below the upper one of the roller bearings 28 and is positioned between the inner face of the housing 23 and the spindle and surrounds the section 22 of the spindle and fits in a recess 34 in the inner face of the housing. A circular cap 35 is positioned in the housing 23 on the upper end of the spindle 17 and adjacent the inner face of the housing and secured to the spindle by a plurality of screws 36 screwing into threaded openings in the section 22 of the spindle. A sealing means 37 is carried by the cap 35 in that it fits in a recess 38 in the cap and engages the inner face of the housing 23. The sealing means 31 and 37 at the lower and upper ends of the housing 23 respectively makes it possible to seal lubricant into the space 39 between the spindle 17 and the housing 23 to provide lubrication for the roller bearings 28. The sealing means 33 is employed below the upper one of the roller bearings 28 to make it possible to retain liquid lubricant within a space 40 for lubricating the upper one of the roller bearings without maintaining the space 39 completely filled. A generally circular housing 41 is disposed on the housing 23 and has a shoulder 42 inclining upwardly and inwardly from its lower end and has a shoulder 43 on its inner face inclining upwardly and outwardly from its upper end and the shoulder 42 on the housing 41 being disposed on the shoulder 27 on the housing 23. The housing 41 is integrally secured to the gooseneck 12. A circular cap 44 has a main cap section 45 and a circular wedge 46 depends from the main cap section and the circular wedge has an upwardly and outwardly inclined shoulder 47 and the circular wedge projects between the housing 23 and the housing 41 with the shoulder 47 on the circular wedge engaging the shoulder 43 on the housing to hold the housing concentric with the axis of the spindle 17. The cap 44 is secured to the housing 23 by a plurality of screws 48 threaded into threaded openings in the top of the housing. The cap 44 is made in two halves as shown in Figure 3 so that a better fit is obtained between the parts. The housing 41 is thus rotatably mounted on the housing 23.

After the housing 23 and the roller bearings 28 have been placed upon the spindle 17 and the lubricant has been added to the spaces 39 and 40 the cap 35 is laid upon the upper end of the inner race of the upper one of the roller bearings 28 and drawn downwardly by screws 36 to place selective endwise loading upon the roller bearings 28. The housing 23 is thus journalled upon the spindle 17 with the correct tensioning for the roller bearings 28 which are within a sealed lubricated container. When it is desired to assemble the spindle 17 with the gooseneck 12, the housing 41 of such gooseneck will be telescoped downwardly over the housing 23 to bring the shoulder 42 of the housing 41 onto the shoulder 27 of the housing 23. Thereafter the cap 44 is telescoped over the upper end of the housing 23 to dispose the wedge 46 between the circular upper section 26 of the housing 23 and the shoulder 43 in the upper end of the housing 41. Downward movement of the wedge 46 against the shoulder 43 of the housing 41 is effected by screwing the screws 48 into the threaded openings in the housing 23.

From the foregoing it will be seen that there has been provided a construction which completely encloses the spindle at all times whether the trailing vehicle is connected or disconnected to the tractor thus preventing damage or element action to the machined surfaces of the spindle and a construction whereby a large number of different types of trailing vehicles can be connected to a tractor.

What is claimed is:

1. Means for hitching a vehicle having wheels to a tractor comprising an upright spindle mounted on the tractor, a first generally circular housing disposed on the spindle and the inner face of the housing being spaced from the spindle, a pair of spaced roller bearings arranged one above the other and disposed between the inner face of the first housing and spindle to rotatably mount the housing on the spindle, sealing means disposed below the lower one of the roller bearings and positioned between the inner face of the housing and the spindle, sealing means disposed below the upper one of the roller bearings and positioned between the inner face of the first housing and the spindle, a first circular cap positioned in the first housing on the upper end of the spindle and adjacent the inner face of the first housing and secured to the spindle, sealing means carried by the first cap and engaging the inner face of the first housing, a second housing rotatably disposed on the first housing and secured to the vehicle, and a cap overlying the second housing and secured to the first housing.

2. Means for hitching a vehicle having wheels to a tractor comprising an upright spindle mounted on the tractor, a first generally circular housing disposed on the spindle and rotatably mounted thereon, a second generally circular housing rotatably mounted on the first housing and secured to the vehicle, and a cap having a main cap section and a circular wedge depending from the main cap section and the circular wedge projecting between the first housing and the second housing to hold the second housing concentric with the axis of the spindle and the cap being secured to the first housing.

3. Means for hitching a vehicle having two wheels to a tractor having two wheels comprising an upright spindle mounted on the tractor, a first generally circular housing disposed on the spindle and rotatably mounted thereon and the lower section of the first housing having a larger diameter than the central section and having an upper section of larger diameter than the central section and an upwardly and inwardly inclined shoulder where the lower section joins the central section, a second generally circular housing disposed on the first housing and having a shoulder inclining upwardly and inwardly from its lower end and having a shoulder on its inner face inclining upwardly and outwardly from its upper end and the first named shoulder on the second housing being disposed on the shoulder on the first housing and the second housing being secured to the vehicle, and a circular cap having a main cap section and a circular wedge depending from the main cap section and the circular wedge having an upwardly and outwardly inclined shoulder and the circular wedge projecting between the first housing and the second housing with the shoulder on the circular wedge engaging the second named shoulder on the second housing to hold the second housing concentric with the axis of the spindle and the cap being secured to the first housing.

4. Means for hitching a vehicle having wheels to a tractor comprising an upright spindle mounted on the tractor so that it is nonrotatable about its longitudinal axis, a first generally circular housing rotatably disposed on the spindle, bearings disposed between the spindle and the first housing and one of the bearings supporting the first housing, a cap disposed in the first housing and overlying the bearings and secured to the upper end of the spindle, a second housing surrounding the first housing and secured to the vehicle, and a cap overlying the second housing and secured to the first housing.

References Cited in the file of this patent

UNITED STATES PATENTS

| | | |
|---|---|---|
| 1,764,902 | Spear et al. | July 17, 1930 |
| 2,361,935 | French | Nov. 7, 1944 |
| 2,400,239 | LeTourneau et al. | May 14, 1946 |
| 2,706,010 | Corsini | Apr. 12, 1955 |